May 20, 1958  C. J. COLLOM  2,835,851
ELECTRICAL CONTROL SYSTEM
Filed Sept. 13, 1946
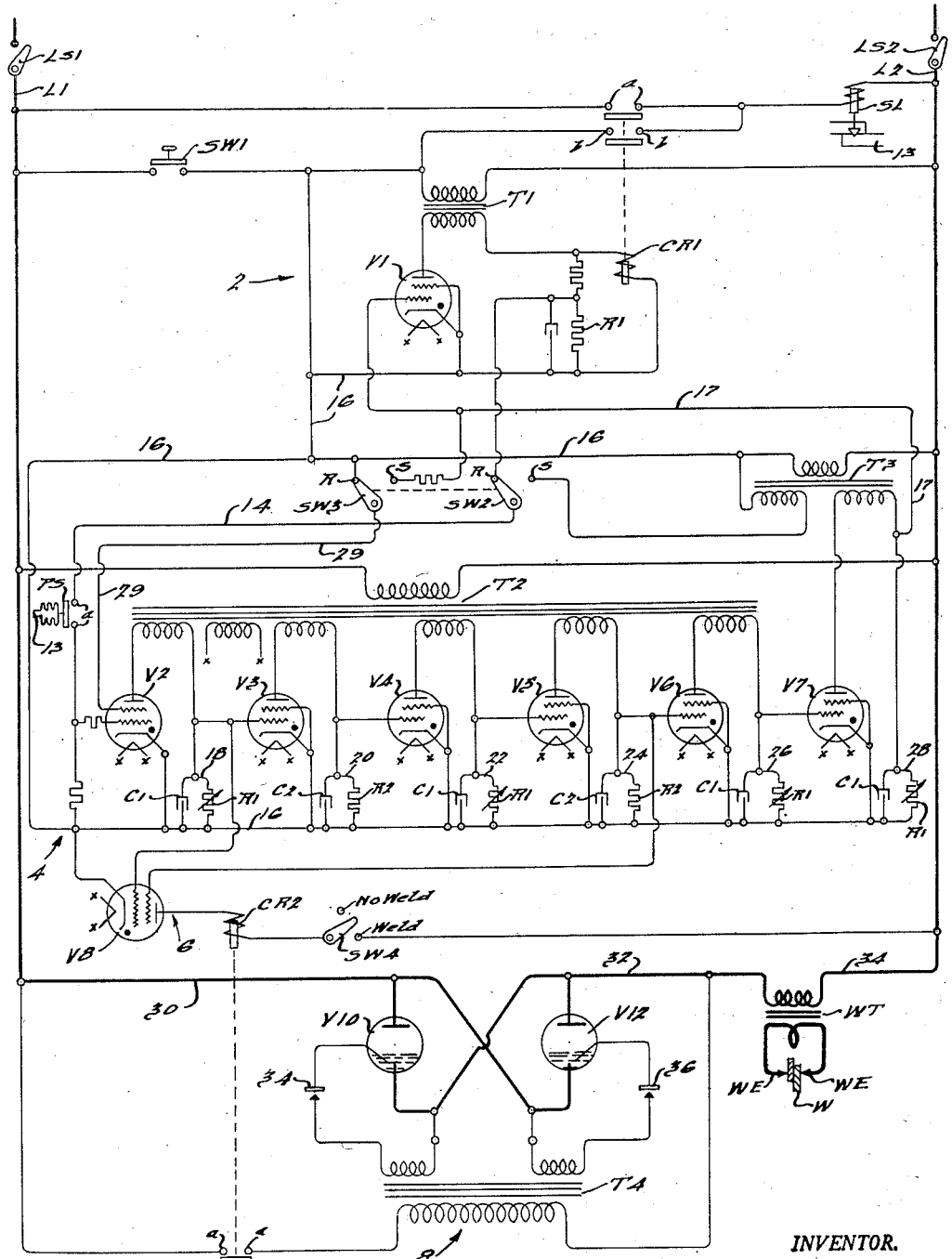
INVENTOR.
Cletus J. Collom.
BY
Harness, Dickey & Pierce
ATTORNEYS.

United States Patent Office 2,835,851
Patented May 20, 1958

2,835,851
ELECTRICAL CONTROL SYSTEM

Cletus J. Collom, Southfield Township, Oakland County, Mich., assignor to Weltronic Company, Detroit, Mich., a corporation of Michigan Application September 13, 1946, Serial No. 696,950

28 Claims. (Cl. 315—252)

This invention relates generally to electrical control systems which systems are particularly adapted for, among other uses, controlling the sequential operation of a welding apparatus and is an improvement over the invention shown and claimed in the copending application of Gustav E. Undy, Serial No. 679,840, filed June 27, 1946, for Electrical Control System, and assigned to the same assignee as is this invention.

The principal objects of the present invention are to provide a control system of the above type which is simple in arrangement and economical of manufacture; to provide such a system which uses a minimum number of electronic controlling valves; to provide an initiating network for such a system having means for maintaining itself energized and for initiating operation of the controlling network; and to provide generally a new and improved electrical controlling system of the type described. Further objects will be apparent from the specification and the appended claims.

A preferred but illustrated embodiment of the invention is shown in the accompanying drawings. It will be appreciated from a complete understanding of the present invention that in a generic sense the improvements thereof may be embodied in electrical control systems intended for various specific purposes, and that such control systems may be variously arranged. In its present preferred form, the invention is utilized to control electric welding circuits of the impulse type and, by way of illustration but not of limitation, the invention is so disclosed herein.

Referring to the drawings by characters of reference, the system comprises generally an initiating network 2, a sequence network 4, an indexing network 6, and a firing network 8 controlling the flow of electrical energy through back-to-back arranged power valves V10 and V12 for controlling the supply of alternating current energy from the lines L1 and L2 to the welding transformer WT. Energization of the initiation network 2 causes fluid pressure to be applied for moving the welding electrodes WE against the work W and actuates the sequence network 4 for controlling the welding cycle comprising the "squeeze time" when the work W is being held by the welding electrodes with no welding current applied, the "welding time" during which welding current is flowing, the "hold time" when the welding electrodes WE are holding the work during cooling, and the "off time" when the electrodes WE are away from the work W so that it may be moved to the next welding position. With the control switches SW2 and SW3 set at "single-weld" position only one welding cycle will occur without an opening of and a reclosing of the energizing switch for the initiating network 2 while with the switches SW2 and SW3 set at "repeat-weld" position the welding cycle will continue to repeat until opening of the switch SW1.

The initiating network 2 comprises a discontinuous type, grid controlled electronic valve V1 having its anode circuit supplied with electrical energy from a transformer T1 having one terminal of its secondary winding connected directly to the anode of the valve V1 and its other terminal connected through the operating coil of a control relay CR1 to the cathode of the valve V1. One terminal of the primary winding of the transformer T1 is connected directly to the line L2 and its other terminal is connected through a manually operable switch SW1 to the line L1. The said other terminal is also connected to line L1 through the contacts $a$ and $b$ of the control relay CR1 to provide a holding or locking circuit for maintaining the transformer T1 energized after initial closure of the normally open switch SW1. The right hand contact $a$ of the control relay CR1 is connected through the energizing or operating coil of an air valve solenoid SL to the line L2, so that upon closure of the contacts $a$ the solenoid SL will be energized for supplying air pressure through conduit 13 to clamp the welding electrodes WE against the work W. A pressure switch PS is connected to the pressure supplying conduit 13 and is operable to close its contacts $a$ at a predetermined pressure of the fluid therein which is indicative of a predetermined engaging pressure of the electrodes WE. A center tap resistor R1 is connected in parallel with the coil of the control relay CR1 and its center tap is connected to one terminal R of a single pole, double throw switch SW2. The blade or pole of the switch SW2 is connected by a conductor 14 to the upper contact $a$ of switch PS. The lower contact of the switch PS is connected to the controlling grid of a discontinuous type grid-controlled electronic valve V2 of the sequence network 4 so that when the valve V1 is conducting and the contacts $a$ of the pressure switch PS are closed, a negative bias will be placed between the grid and cathode of the valve V2 whereby the valve V2 will be in a blocked condition; the cathodes of valves V1 and V2 being connected to a common cathode bus 16. The controlling grid of the valve V1 is connected by conductor 17 to the network 4 whereby the conductivity thereof is controlled in accordance with the operating condition of the network 4.

The sequence network 4 comprises valves V2—V6, each having their cathodes directly connected to the bus 16. The anodes of the valves V2—V6 are each connected to respective terminals of secondary windings of a transformer T2 having its primary winding energized by the lines L1 and L2. The other terminals of each of these secondary windings of the transformer T2 are connected through impedance networks 18, 20, 22, 24, and 26 to the common cathode bus 16 completing the anode circuits. Transformer T3, having its primary winding connected between the cathode bus 16 and line L2, has one terminal of one of its secondary windings connected directly to the anode of the valve V7 and its other terminal connected through an impedance network 28 to the bus 16. The conductor 17 connected to the grid of valve V1 is connected intermediate the impedance network 28 and the said other terminal of the transformer T3 so that when current is flowing through the network 28 the grid of the valve V1 will be negatively biased.

The impedance networks 18, 22, 26, and 28 each comprise a capacitor C1 and a variable resistor R1 having their values so proportioned relative to each other that the capacitor C1 will maintain a potential across its resistor R1 for a predetermined time interval subsequent to de-energization of the respective anode circuits in which they are connected and which interval is equal to the time interval desired to be measured. As indicated, the resistors R1 are adjustable to vary this interval from a period equal to that required for a few cycles of a 60-cycle alternating source to that required for 60 cycles. For example, with 220 volts at a 60 cycle frequency applied by the secondary windings of the transformer T2 to the valves, the capacitor C1 may have a value of .25 microfarad and the resistor may have a maximum value of 1 megohm. It will be obvious that an increase in the magnitude of the capacity or the resistance will provide a time period. The networks 20 and 24 are composed of similar elements C2 and R2. However, the values of C2 and R2 are so chosen that the capacitors C2 are able to maintain a potential drop across their respective resistors R2 only for a period of one or two cycles of a 60-cycle alternating current. For example, the value of the capacitor C2 may be from 0.05 to 0.1 microfarad and the value of the resistance may be 50,000 ohms. Generally speaking, the impedance networks 18, 22, 26, and 28, comprise time delay networks while the networks 20 and 24 are considered, from the sequence operation standpoint, as having no time-delay function; their purpose being to maintain the grid of the valves V4 and V6 respectively positive during the half cycle of current when the valves V3 and V5 are not conducting. The terminal of the impedance networks 18, 20, 22, 24, and 26, opposite to the terminal thereof connected to the common cathode bus 16, are respectively connected by means of conductors to the grids of the valves V3, V4, V5, V6, and V7, whereby when current is flowing through the impedance network the grid connected thereto will be rendered negative with respect to the common cathode connection and the respective valves V1–V7 will be rendered blocked. The valves V2, V4, and V6 are normally conductive and maintain a potential difference across their respective impedance networks 18, 22, and 26 blocking the valves V3, V5, and V7 respectively due to the positive bias of the grids of these valves with respect to the cathodes with which these grids are associated.

The other secondary winding of the previously mentioned transformer T3 is connected between the common cathode bus 16 and the terminal S of the switch SW2. The screen or second grid of the valve V2 is connected by a conductor 29 to the blade or pole of a single pole, double throw switch SW3 having one terminal R connected to bus 16 and the other terminal S connected through a resistor to the conductor 17. The switches SW2 and SW3 may be mechanically interconnected for synchronous operation as indicated by the dotted line, if desired whereby the welding cycle controlled by the sequence network 4 may be made to occur only once when the switches SW2 and SW3 are in the S positions or may be made to reoccur as long as the switch SW1 remains closed when the switches SW2 or SW3 are in the R position, as shown.

The indexing network 6 comprises a single discontinuous type grid-controlled electronic valve V8 having its cathode connected to the common cathode bus 16 and its anode connected through the actuating coil of a control relay CR2 and a manually operable switch SW4 to the line L2. The switch SW4 may be moved to open position should it be desired, as for testing purposes, to actuate the control system without permitting welding current to flow. Energization of the control relay CR2 will close its contacts a to energize the firing network 8. The valve V8 is of the dual grid type in which either grid will block the valve, one of the grids being connected to the grid of the valve V3 and the other of the grids being connected to the valve V6 whereby the valve V8 is conductive when both of the valves V3 and V6 are conductive.

The firing network 8 for firing the valves V10 and V12 comprises a transformer T4 having one terminal of its primary winding connected through the contacts a of the control relay CR2 to the line L1 and its other terminal connected through the primary winding of the welding transformer WT to the line L2. The anode of the valve V10 and the cathode of the valve V12 are connected together and to the line L1 by conductor 30, while the cathode of the valve V10 and the anode of the valve V12 are connected together and to one terminal of the primary winding of the welding transformer WT by a conductor 32. The other terminal of the transformer WT is connected to the line L2 by a conductor 34. The valves V10 and V12 are of the so-called mercury pool type and are rendered conductive by the application of a critical potential between its igniter and its cathode. The transformer T4 has a pair of secondary windings, one of the secondary windings having one terminal connected to the cathode of the valve V10 and its other terminal connected through a rectifying device, which may be of the copper oxide type, to the igniter of the valve V10. The other secondary winding of the transformer T4 is similarly connected between the cathode and igniter of the valve V10 through a rectifying device 36 similar to the device 34. It will be noted that the primary winding of the transformer T4 is connected between the anodes of the valves V10 and V12 so that when the valves V10 and V12 are both in a blocked condition, substantially the full line voltage of the lines L1 and L2 is applied to the transformer T4, but when either of the valves V10 and V12 is conducting only the potential drop across the conducting one of the valves appears across the primary winding of the transformer T4.

It is thought that the remaining details of the system may best be understood with reference to a description of its operation. Assuming that it is desired to condition the system for repeat operation with the switches SW2 and SW3 in the position shown, the usual disconnect switches LS1 and LS2 are closed thereby connecting the line conductors L1 and L2 to a source of supply which may be a conventional 60-cycle alternating current system. Energization of the lines L1 and L2 immediately energizes the transformer T2 causing the secondary winding thereof having the terminals designated $x$—$x$ which are connected to the respective heater terminals $x$—$x$ of valves V1–V8 inclusive to condition the valves for operation. As the valves V1–V8 are conditioned for operation due to energization of their respective heaters, the valve V2 will become conductive since both of its grids are connected to the common cathode bus 16 and the pressure switch PS is maintaining its contacts a open circuited. Valve V3 will be blocked due to the conduction of the valve V2 which impresses a potential across its time-delay impedance network 18 which is applied between the controlling grid and cathode of the valve V3. Since the valve V3 is blocked, the grid of the valve V4 will be maintained at cathode potential and the valve V4 will conduct, causing a potential difference to be maintained across its impedance network 22 which potential difference is applied to bias the grid of the valve V5 negatively with respect to its cathode holding the valve V5 blocked. The grid of the valve V6 will be at cathode potential and the valve V6 will be conductive, impressing a potential difference across its impedance network 26 which biases the grid of the valve V7 negatively with respect to its cathode, placing the valve V7 in a blocked condition, so that upon closure of the switch SW1 (described below) and energization of the transformer T3, the valve V7 will not conduct and the grid of the valve V1 will remain neutral with respect to its cathode. The valve V1, however, will remain in a non-conductive condition until the transformer T1 is energized and which will not occur until closure of the switch SW1 to initiate a sequence of operations. The left-hand grid of the valve V8, which is connected directly to the grid of the valve V3, is being maintained negative with respect to the common cathode connection 16 due to the conduction of the valve V2 so that the valve V8 will be held in a blocked condition even though its right-hand controlling grid is maintained at cathode potential due to the blocked condtion of valve V5. The controlling relay CR2 will, therefore, remain de-energized with its contacts a open maintaining the transformer T4 de-energized. The system is now in readiness for operation and the work W may be inserted between the welding electrodes WE.

To initiate a welding operation, the switch SW1 is now closed, energizing the transformers T1 and T3. Since the valve V1 was in readiness to conduct as soon as a potential was supplied to its anode circuit, current will flow from the transformer T1 to the valve V1 and through the winding of the controlling relay CR1 back to the transformer. The control relay CR1, as well as the relay CR2, will remain in closed circuit position even though they are energized only during a half cycle. Energization of the controlling relay CR1 closes its contacts *a* and *b*, which energizes a holding circuit around the switch SW1 for maintaining the transformer T1 energized and also energizes the solenoid SL to supply fluid pressure to the conduit 13 for moving the welding electrodes WE against the work W. When a predetermined pressure has been built up to hold the welding electrodes WE against the work W, the pressure switch PS will be actuated to close its contacts *a*, placing a negative bias on the lower controlling grid of valve V2 which is transmitted thereto through the conductor 14 from the center tap of the resistor R1. The valve V2, therefore, becomes blocked at the end of its conducting half cycle allowing the condenser C1 of the time-control impedance network 18 to discharge through its resistor R1 and which, after a predetermined time interval, depending upon the setting of the resistor R1 and of sufficient length to allow the electrodes to properly seat against the work at a pressure suitable for welding, will remove the negative bias from the grid of the valve V3 and the left-hand grid of the valve V8.

The removing of the negative bias from the left-hand grid of the valve V8 permitted this valve to conduct since the right-hand grid thereof was at cathode potential due to the blocked condition of the valve V5 as hereinbefore described. Assuming the switch SW4 to be closed or in the weld position and the line L2 positive with respect to line L1, current will flow from the line L1 through switch SW1, conductor 16, valve V8, the actuating winding of relay CR2, and the switch SW4 to the line L2 to close the contacts *a* of the relay CR2. Closure of these contacts *a* completes the firing circuit from line L1 through contacts *a* of relay CR2, the primary winding of the transformer T4 and the primary winding of the transformer WT to line L2, placing a firing potential between the igniter and cathode of the valve V12 to render it conductive for energizing the welding transformer WT. Firing of the valve V12 substantially de-energizes the firing circuit since the potential thereacross is only the potential drop of the valve V12. It may here be noted that the current flowing through the firing circuit, just mentioned, also flows through the welding transformer WT, but due to its small magnitude is ineffective to cause welding current to flow between the electrodes WE.

As the line L1 becomes positive with respect to the line L2, current through the valve V8 will cease, but the lag in operation of the relay CR2 is sufficiently great so that the contacts *a* thereof are not opened and current will flow from the line L1 to the line L2 through the transformers T4 for energization of the welding transformer WT to fire the valve V10 in the same manner as valve V12 was fired. This alternate firing of the valves V10 and V12 will continue as long as contacts *a* of the relay CR2 remain closed.

The removal of the negative bias from the grid of the valve V3 as hereinbefore described permits valve V3 to conduct and establish a potential drop across its impedance network 20 to negatively bias the grid of the valve V4 and render the valve V4 nonconductive or blocked at the end of the conducting half cycle. This rendering of the valve V3 conductive and valve V4 blocked occurs substantially concurrently with the rendering of the valve V8 conductive and energization of the welding transformer WT. The rendering of the valve V4 blocked is without immediate effect due to the potential maintaining characteristics of the time-delay network 22. After a predetermined time interval, however, the negative potential held on the grid of the valve V5 by the network 22 will disappear and the valve V5 will conduct and establish a potential drop across its impedance network 24 to negatively bias the grid of the valve V6 and the right-hand grid of the valve V8 so that these valves will be blocked at the end of their conducting half cycles.

The blocking of the valve V8 de-energizes the circuit of the control winding of the relay CR2 opening the contacts *a* thereof to de-energize the firing network 8. Since substantially all of the time required for all of the operational steps of the sequence network from the firing of valve V3 to the blocking of the valve V6 is in the time-delay network 22, the delay afforded by this network 22 establishes the welding time interval of the control systems.

The blocking of the valve V6 is without immediate effect due to the potential maintaining characteristics of the time delay network 26. After a predetermined time interval which is the "hold time" of the control system, the negative bias on the grid of the valve V7 will disappear due to the discharging of the condenser C1 of the network 26 through its resistor R1 rendering the valve V7 conductive to establish a potential drop across its network 28. This renders the conductor 17 negative with respect to the common cathode bus 16 to bias the grid of the valve V1 negatively with respect to its cathode blocking the valve V1 and de-energizing the control relay CR1 which, when the contacts *a* and *b* thereof open, de-energize the solenoid SL removing the fluid pressure to the welding electrodes WE which release the work W starting the "off time" of the welding cycle.

Blocking of the valve V1 initiates the resetting cycle portion of the network 4 by removing the potential drop across the resistor R1 which removes the negative or blocking bias on the lower grid of the valve V2 rendering it again conductive. Conduction of valve V2 establishes a potential drop across its network 18 which biases the controlling grid of the valve V3 negative to block this valve and remove the potential drop across the network 20 and, consequently, the negative blocking bias on the grid of the valve V4. With its blocking bias removed, valve V4 conducts to establish a potential drop across network 22 and place a negative blocking bias on the control grid of valve V5 whereby valve V5 is blocked. Blocking of the valve V5 removes the potential drop across the network 24 and the blocking bias on the grid of the valve V6 so that valve V6 is again conductive to establish a potential drop across the network 26 and a blocking bias on the control grid of the valve V7 rendering valve V7 blocked. The series of establishing and removing blocking biases just described occurs very rapidly in the matter of a very few cycles of voltage between the lines L1 and L2 since the de-energized networks 20 and 24 are substantially without time in their operation while the energized networks 18, 22, and 26, while having time-delay characteristics upon de-energization, establish a potential drop thereacross with substantially no time delay.

Rendering of the valve V7 blocked is without immediate effect due to the potential maintaining characteristics of the network 28. Subsequent to a predetermined time interval, which is the "off time" of the welding cycle, the condenser C1 of the network 28 will have discharged through its associated resistor R1 removing the negative bias on the conductor 17 and, consequently, on the controlling grid of the valve V1 at which time the control system will have completed one welding cycle.

If now the switch SW1 is still closed, a subsequent cycle similar to the one just described is immediately initiated. These welding cycles continue in integral number as long as the switch SW1 is maintained closed. If, however, the switch SW1 is opened during a cycle of operation, the conduction of the valve V1 maintains the relay CR1 energized and the transformer T1 energized from the line L1 through contacts *a* and *b* thereof to the line L2 until the valve V7 becomes conductive in the sequence of operation to block the valve V1. As the valve V1 becomes nonconductive, the control relay CR1 opens thereby de-energizing the transformers T1 and T3. De-energization of the transformer T3 will have the same effect as the blocking of the valve V7 in the usual resetting cycle portion of the operation just described with the switch SW1 closed and occurs at just about the same time as the controlling grid thereof is biased negatively by the resetting cycle portion initiated by blocking of the valve V1. The network 4 is, therefore, in its initial condition, but due to the opening of switch SW1, no further subsequent welding sequence will be initiated. Subsequent reclosures of the switch SW1 will initiate subsequent welding cycles.

If the switches SW2 and SW3 are moved from the R position to the S position, which signifies transfer from repeat to single operation, closure of the switch SW1 energizes the transformers T1 and T3 as before so that the valve V1 will conduct and the control winding for the control relay CR1 will be energized closing the contacts *a* and *b* as in the case of the repeat operation, above described. This energizes the solenoid SL which opens the air valve to move the welding electrodes WE against the work W, and after sufficient pressure has built up in the air line the switch PS will close its contacts *a* so that the transformer T3 will supply a negative potential through the switch SW2 to the grid of the valve V2 rendering it blocked. The valves V3, V4, V5, V6, and V7 then likewise are rendered conductive, blocked, conductive blocked and conductive, in the order mentioned, similarly as described with respect to the repeat operation to control the "squeeze time," "welding time," and "hold time" of the control systems. However, unlike the repeat condition, the single operation position of switch SW3 connects the conductor 17 to the upper controlling grid of the valve V2 so that the same negative potential supplied to the grid of the valve V1 is also supplied to the upper grid of the valve V2 to insure that valve V2 will remain blocked as long as switch SW1 is closed, even though the pressure switch PS opens due to blocking of the valve V1.

The switch SW2 and the left-hand secondary winding of the transformer T3 associated therewith could be omitted and the lower grid of the valve V2 directly connected to the resistor R1 if desired, although in some instances its use may be deemed desirable. Also, if desired, the switch PS could be eliminated and sufficient time be included in the network 18 to insure a good squeeze of the work W by the electrodes WE, however, here again it is preferred to use the switch PS to prevent the operation of the sequence network 4 in the event the electrodes WE are not properly held against the work W for any reason, as for example the failure of the solenoid SL or of the fluid pressure controlled thereby.

Although only a single specific embodiment of the invention has been described in detail, it will be appreciated that various modifications in the form, number, and arrangement of the parts may be made without departing from the spirit and scope of the invention.

What is claimed and what is desired to be secured by United States Letters Patent is:

1. In a timing apparatus, a sequence controlling network comprising a plurality of valve means, a controlling means operable to place the first operating one of the valve means of said network in one controlling condition to initiate the operation of said network whereby the last operating one of the valve means of said network is placed in an operated condition, said first valve means having a pair of electrodes, said last valve means having an anode circuit with electrically spaced points the potential therebetween being a function of the controlling condition of said last valve means, means connecting said points to said electrodes whereby the potential between said points when said last valve means is in its said operated condition renders said first operating valve means in a second operating condition, said circuit including chargeable means controlled by said last operating valve means for maintaining said potential for a predetermined time interval subsequent to a change in the controlling condition of said last valve means from said operated condition whereby a desired measured time interval is provided between the rendering of said last valve means from its said operated condition and the placing of said first valve means in its said one condition.

2. In a timing apparatus, a sequence controlling network comprising a plurality of valve means having an initial and an actuated operating condition, an initiating network having two operating conditions and operable in one of said conditions to place the first operating one of the valve means of said sequence network in its actuated condition, means for selectively rendering said initiating network in said one condition, the last operating one of the valve means of said sequence network acting as a consequence of said last valve means being placed in its actuated condition to change said initiating network from said one condition to the other of said conditions irrespective of said selective means, said last named means including an energy storage device controlled by said last valve means, said device being operable to maintain said initiating network in said other condition for a predetermined time interval subsequent to said last valve means being placed in its initial condition.

3. In a timing apparatus, a sequence controlling network comprising a plurality of valve means having an initial and an actuated operating condition, an initiating network operable to place the first operating one of the valve means of said sequence network in its actuated condition, means for selectively rendering said initiating network effective, the last operating one of the valve means of said sequence network being operable upon being placed in its actuated condition to render said initiating network ineffective irrespective of said selective means, means operable by said last valve means for maintaining said initiating network ineffective for a predetermined time interval subsequent to said last valve means being placed in its initial condition, a valve means having a pair of controlling grids and a cathode, and circuit means actuated by said sequence network for controlling the bias of said grids with respect to said cathode.

4. In a timing apparatus, a sequence controlling network comprising a plurality of valve means having an initial and an actuated operating condition, an initiating network operable to place the first operating one of the valve means of said sequence network in its actuated condition, means for selectively rendering said initiating network effective, the last operating one of the valve means of said sequence network being operable upon being placed in its actuated condition to render said initiating network ineffective irrespective of said selective means, an energy storage device controlled by said last valve means, said device being chargeable to maintain said initiating network ineffective for a predetermined time interval subsequent to said last valve means being placed in its initial condition, an anode circuit for said last valve means, and circuit means controlled by said selective means for controlling the de-energizing of said anode circuit whereby said device is permitted to discharge.

5. In a timing apparatus, a first valve means having a controlling grid and a pair of main electrodes, an energizable device, circuit means interconnecting said main electrodes and said device whereby changes in conductivity of said valve means controls the energization of said device, a potential supplying means for supplying a potential to said circuit means, a second valve means having a grid and a pair of main electrodes, circuit means interconnecting one of said last-named main electrodes and said last-named grid to said first-named circuit means at spaced points between which a potential exists during current flow in said first-named circuit means whereby the potential between said points will be applied as a control potential to said second valve means, means actuated by said device to maintain said potential supplying means effective to supply said circuit means, means actuated by said second valve means to actuate a second controlling means, circuit means connected between said first-named grid and one of said first-named pair of main electrodes for applying a control potential therebetween, said last-named circuit means being actuated as a consequence of the actuation of said second controlling means.

6. In a timing apparatus, a first valve means having a controlling grid and a pair of main electrodes, an energizable device, circuit means interconnecting said main electrodes and said device whereby changes in conductivity of said valve means controls the energization of said device, a potential supplying means for supplying a potential to said circuit means, a sequencing network comprising a plurality of valve means, one of said plurality of valve means having a grid and a pair of main electrodes, circuit means interconnecting one of said last-named main electrodes and said last-named grid to said first-named circuit means at spaced points between which a potential exists as a function of the conductive condition of said first-named circuit means whereby the potential between said points will be applied as a control potential to said one valve means, another of said plurality of valve means having principal electrodes, circuit means including a source of potential associated with said other valve means principal electrodes and having electrically spaced portions the potential therebetween being a function of the conductivity of said other valve means, and circuit means connecting said last-named electrically spaced portions to said first-named grid and one of said first-named pair of main electrodes whereby a control potential which is a function of the potential between said last-named electrically spaced portions is applied between said first valve grid and one main electrode.

7. In a timing apparatus, a first valve means having a controlling grid and a pair of main electrodes, an electromagnetic relay, circuit means interconnecting said main electrodes and said relay whereby changes in conductivity of said valve means control the operation of said relay, a potential supplying means for supplying a potential to said circuit means, a sequencing network comprising a plurality of valve means, one of said plurality of valve means having a grid and a pair of main electrodes, circuit means interconnecting one of said last-named main electrodes and said last-named grid to said first-named circuit means at spaced points between which a potential exists during current flow in said first-named circuit means whereby the potential between said points will be applied as a control potential to said one valve means, another of said plurality of valve means having principal electrodes, circuit means associated with said other valve mean principal electrodes and having electrically spaced portions the potential therebetween being a function of the conductivity of said other valve means, circuit means connecting said last-named electrically spaced portions to said first-named grid and one of said first-named pair of main electrodes whereby a control potential which is a function of the potential between said last-named electrically spaced portions is applied between said first valve grid and one main electrode, and means actuated by said relay for controlling the application of said first-named supply potential to said one valve means.

8. In a timing apparatus for controlling the sequence of a plurality of operations, a controlling network for each operation, each controlling network comprising grid-controlled valve means having an anode and a cathode and a controlling grid and an anode circuit including a time-delay impedance network, an initiating network comprising grid-controlled valve means having an anode circuit, means for energizing said initiating network, magnetically operated relay means operable by said initiating network anode circuit for maintaining said initiating network energized, said initiating network circuit having spaced points between which a potential exists during periods in which current flows through said initiating network circuit, means electrically coupling said points between said cathode and said grid of the valve means of the first of said controlling networks for biasing said first controlling network valve means into a blocked condition, and circuit means for impressing the potential of the last of said controlling networks time delay network on said initiating network for biasing said initiating network valve means whereby said initiating network is de-energized.

9. In a timing apparatus for controlling the sequence of a plurality of operations, a plurality of interconnected controlling networks operable in predetermined sequence, an initiating network for said controlling networks having a control device in which a potential which may be applied thereto controls the conducting condition of said initiating network, switch means for connecting a source of potential to said anode circuit, electro-magnetic switch means in by-pass arrangement with said first named switch means operable upon energization of said circuit to maintain said circuit energized, the last one of said controlling networks having a pair of terminals between which a potential is established during a conductive condition of said last controlling network, means electrically coupling said terminals for applying a potential to said device whereby said initiating network will be controlled by said last controlling network.

10. In a timing apparatus for controlling the sequence of a plurality of operations, a plurality of interconnected controlling networks operable in predetermined time sequence, the last one of said controlling networks including a time-delay network comprising an energy storage device operable to maintain a predetermined potential in said last network for a predetermined time interval subsequent to de-energization of said last network, an initiating network for said controlling networks comprising a grid-controlled electronic valve having an anode circuit, switch means for connecting a source of potential to said anode circuit, means operable upon energization of said anode circuit to maintain said anode circuit energized, circuit means for applying the potential of said time-delay network to said initiating network whereby said valve is rendered non-conductive.

11. In a timing apparatus for controlling the sequence of a plurality of operations, a network for controlling each operation, each of said network comprising valve means having an anode circuit including a time-delay impedance network comprising an energy storage device operable to maintain a potential in said impedance network for a predetermined time interval subsequent to de-energization of its respective circuit, circuit means for supplying said potential to the respective subsequent controlling network whereby the anode circuit of said respective subsequent network is controlled, valve means having an anode and a cathode and a pair of controlling grids, and circuit means for biasing one of said grids for controlling conductivity of said last-named valve means by one of said controlling networks and for biasing the other of said grids for controlling conduction of said last-named valve means by another of said controlling networks.

12. In a timing apparatus for controlling the sequence of a plurality of operations, a network for controlling each operation, each of said networks comprising valve means having an anode circuit including a time-delay impedance network comprising an energy storage device operable to maintain a potential in said impedance network for a predetermined time interval subsequent to de-energization of its respective circuit, circuit means for supplying said potential to the respective subsequent controlling network whereby the anode circuit of said respective subsequent network is controlled, valve means having an anode and a cathode and a pair of controlling grids, circuit means connecting one of said grids to one of said time-delay networks for biasing one of said grids for controlling conductivity of said last-named valve means by said one time-delay network, and circuit means connecting the other of said grids to another of said time-delay networks for biasing the other of said grids for controlling conduction of said last named valve means by said other time-delay network.

13. In a timing apparatus for controlling the sequence of a plurality of operations, a controlling network for each operation, a first and a fourth of said controlling networks comprising a sole grid-controlled electronic valve having an anode circuit including a time-delay impedance network comprising an energy storage device operable to maintain a predetermined minimum potential thereacross for a predetermined time interval subsequent to de-energization of said anode circuit, a second and a third of said controlling networks comprising a first and a second grid-controlled electronic valve each having an anode circuit including an impedance network, said second valve impedance networks being time-delay impedance networks comprising an energy storage device operable to maintain a predetermined minimum potential thereacross for a predetermined time interval subsequent to de-energization of its respective anode circuit, the time impedance networks of said first and second controlling networks being operable to bias respectively the first valve of said second and third controlling networks into a blocked condition whereby the second valves of said second and third controlling networks are normally maintained conductive, the time network of said third controlling network normally biasing said fourth controlling network valve into a blocked condition, initiating means having a controlling condition for blocking the valve of said first network, and means controlled by the valve of said fourth controlling network for maintaining said initiating means in its controlling condition for a complete sequence of operations.

14. In a timing apparatus for controlling the sequence of a plurality of operations, a controlling network for each operation, each network comprising grid-controlled valve means having an anode circuit including an impedance network, an initiating network for said controlling networks comprising grid-controlled valve means having an anode circuit including an impedance network, potential supplying means for said initiating network and for one of said controlling networks, switch means for energizing said potential means, potential supplying means for other of said controlling networks, and circuit means energizing said last named potential means independently of said first named potential means.

15. In a timing apparatus for controlling the sequence of a plurality of operations, a controlling network for each operation, each network comprising grid-controlled valve means having an anode circuit including an impedance network the energization whereof is controlled by the conducting condition of the respective valve means, an initiating network comprising grid-controlled valve means having an anode circuit including an impedance network the energization whereof is controlled by the conductive condition of said initiating network valve means, circuit means for supplying grid biasing potential from the potential appearing across the impedance network of said initiating network to one of said controlling networks whereby said one controlling network is responsive to an operating condition of said initiating network, grid biasing means for said one controlling network independent of said initiating network, circuit means for selectively biasing said one controlling network by said initiating network or said biasing means, potential supplying means for said initiating network and for the last to operate of said controlling networks, switch means for energizing said potential means, potential supplying means for other of said controlling networks, and circuit means energizing said last named potential means independently of said first named potential means.

16. In a timing apparatus for controlling the sequence of a plurality of operations, a controlling network for each operation, each network comprising grid-controlled valve means having an anode circuit including an impedance network the potential across which is a function of the conducting condition of the respective valve means, an initiating network for said controlling networks comprising grid-controlled valve means having an anode circuit including an impedance network the potential across which is a function of the conducting condition of said initiating network valve means, potential supplying means for said initiating network and for one of said controlling networks, switch means for energizing said potential means, potential supplying means for other of said controlling networks, circuit means energizing said last named potential means independently of said first named potential means, and circuit means operably interconnecting said one controlling network to the first to operate of said controlling network to provide a controlling potential for the one of said valve means associated with said first network whereby said first network is controlled by said one controlling network independently of said initiating network.

17. In a timing apparatus, a first valve means having a pair of principal electrodes and a controlling electrode, an electro-magnetic relay having an energizable winding and controlling means, a pair of terminals adapted to be supplied with electrical energy, circuit means electrically coupling said winding and said valve means together whereby the conductivity of said valve means controls the actuation of said relay, switch means for electrically coupling said circuit means to said terminals, said controlling means acting upon actuation of said relay to couple said circuit to said terminals in parallel arrangement with said switch means, a series of sequentially actuated networks, each said network having a first pair of terminals the potential between which is effective to control the operating condition of the respective said network, each said network further having a second pair of terminals the potential between which is a function of the operating condition of the respective said network, circuit means connecting said second pair of terminals of each of the actuated networks prior to the last actuated one of said networks to said first pair of terminals of the respective next subsequent one of said networks whereby said subsequent networks are respectively controlled by the next preceding networks, said relay controlling means acting upon energization of said relay to initiate an operation of the first to be actuated of said networks, and circuit means interconnecting said second pair of terminals of said last actuated network between said controlling electrode and one of said principal electrodes.

18. In a timing apparatus, a first valve means having a pair of principal electrodes and a controlling electrode, an electromagnetic relay having an energizable winding and controlling means, a pair of terminals adapted to be supplied with electrical energy, circuit means electrically coupling said winding and said valve means together whereby the conductivity of said valve means controls the actuation of said relay, switch means for electrically coupling said circuit means to said terminals, said controlling means acting upon actuation of said relay to couple said circuit to said terminals in parallel arrangement with said switch means, a series of sequentially actuated networks, each said network having a first pair of terminals the potential between which is effective to control the operating condition of the respective said network, each said network further having a second pair of terminals the potential between which is a function of the operating condition of the respective said network, circuit means connecting said second pair of terminals of each of the actuated networks prior to the last actuated one of said networks to said first pair of terminals of the respective next subsequent one of said networks whereby said subsequent networks are respectively controlled by the next preceding networks, said relay controlling means acting upon energization of said relay to initiate an operation of the first to be actuated of said networks, a dischargeable energy storage device connected between said second pair of terminals of said last actuated network, and circuit means interconnecting said storage device between said controlling electrode and one of said principal electrodes.

19. In a timing apparatus, a first valve means having a pair of principal electrodes and a controlling electrode, an electromagnetic relay having an energizable winding and controlling means, a pair of terminals adapted to be supplied with electrical energy, circuit means electrically coupling said winding and said valve means together whereby the conductivity of said valve means controls the actuation of said relay, switch means for electrically coupling said circuit means to said terminals, said controlling means acting upon actuation of said relay to couple said circuit to said terminals in parallel arrangement with said switch means, a series of sequentially actuated networks, the last actuated one of said networks having a first pair of terminals the potential between which is a function of the operating condition of the respective said network, said relay controlling means acting upon energization of said relay to initiate an operation of the first to be actuated of said networks, and circuit means interconnecting said first pair of terminals of said last actuated network between said controlling electrode and one of said principal electrodes.

20. The combination of claim 19 in which a dischargeable energy storage device is connected between said first pair of terminals of said last actuated network.

21. In a timing apparatus, a first valve means having a pair of principal electrodes and a controlling electrode, an electromagnetic relay having an energizable winding and first switch means, a pair of terminals adapted to be supplied with electrical energy, circuit means electrically coupling said winding and said valve means together whereby the conductivity of said valve means controls the energization of said relay, a second switch means for electrically coupling said circuit means to said terminals, said first switch means acting upon actuation of said relay to couple said circuit to said terminals in parallel arrangement with said second switch means, a series of sequentially actuated networks, the last actuated one of said networks having a first pair of terminals the potential between which is a function of the operating condition of the respective said network, a dischargeable electrical energy storage device connected between said network pair of terminals, said relay switch means acting upon energization of said relay to complete a circuit to the first to be actuated of said networks to initiate an operation thereof and acting upon de-energization of said relay to de-energize said last actuated network to initiate a discharging action of said device, and circuit means interconnecting said second pair of terminals of said last actuated network between said controlling electrode and one of said principal electrodes.

22. A timing apparatus, a plurality of electric circuits, each said circuit having an initial and an actuated condition, a first of said circuits having a valve with a pair of main electrodes and a control electrode and a relay having a winding in series with said main electrodes, switch means for selectively connecting said first circuit to a source of potential, a subsequent one of said circuits including a reactive network, said circuits including conducting means for applying at least a portion of the potential appearing across said reactive network between said control electrode and one of said main electrodes to render said valve in a blocked condition as a consequence of the rendering of said subsequent circuit in its said actuated condition, said relay having contacts arranged to energize said first circuit independently of said switch means, and said circuits including means effective as a consequence of said first circuit being in its said initial condition for maintaining said subsequent circuit in its said initial condition.

23. A timing apparatus, a plurality of electric circuits, each said circuit having an initial and an actuated condition, means for selectively rendering a first of said circuits into its actuated condition, a subsequent one of said circuits including a timing network, said timing network including an energy storage device having a discharging element connected in parallel therewith, said circuits including conducting means for applying at least a portion of the potential appearing across said timing network to said first circuit in such polarity as to render said first circuit in its said initial condition as a consequence of the rendering of said subsequent circuit in its said actuated condition, said circuits including means actuated as a consequence of said first circuit being rendered in its said initial condition to render said subsequent circuit in its said initial condition, said timing network being arranged to hold said first circuit in its said initial condition for a predetermined time interval subsequent to the rendering of said subsequent circuit into its said initial condition.

24. A timing apparatus, a plurality of electric circuits, means for selectively connecting a first of said circuits to a source of potential to render said first circuit in a conductive condition, a subsequent one of said circuits including a timing network, said timing network comprising a reactive element and a resistive element connected in parallel, said circuits including means responsive to said first circuit being rendered in said conductive condition to render said subsequent circuit in a conductive condition, conducting means for applying at least a portion of the potential appearing across said timing network to said first circuit to render said first circuit in a nonconducting condition as a consequence of the rendering of said subsequent circuit in its said conducting condition, said first circuit responsive means further being effective to render said subsequent circuit in a nonconducting condition as a consequence of said first circuit being rendered in said nonconducting condition, said timing network being arranged to hold said first circuit in its said nonconducting condition for a predetermined time interval subsequent to the rendering of said subsequent circuit into its said nonconducting condition.

25. A timing apparatus, a plurality of electric circuits, means for selectively connecting a first of said circuits to a source of potential to render said first circuit in a conductive condition, said circuits including current responsive means for maintaining said source connected to said first network as a consequence of said first circuit being rendered conductive, a subsequent one of said circuits including a timing network, said timing network comprising a reactive element and a resistive element connected in parallel, said circuits including means responsive to said first circuit being rendered in said conductive condition to render said subsequent circuit in a conductive condition, said circuits including conducting means for applying at least a portion of the potential appearing across said timing network to said first circuit to render said first circuit in a nonconducting condition as a consequence of the rendering of said subsequent circuit in its said conducting condition, said first circuit responsive means further being effective to render said subsequent circuit in a nonconducting condition as a consequence of said first circuit being rendered in said nonconducting condition, said timing network being arranged to hold said first circuit in its said nonconducting condition for a predetermined time interval subsequent to the rendering of said subsequent circuit into its said nonconductive condition.

26. In a timing system adapted to be energized from a source of alternating electrical energy, a first valve connected across said source including switch means controlling energization thereof, switch means controlled in accordance with a conductive condition of said valve and operable upon initial conduction of said valve to maintain said valve energized irrespective of said first named switch means, a second valve means having a pair of main electrode means and controlling electrode means, said second valve means having a plurality of controlling functions, means connecting said second valve means across said source, a first dischargeable source of potential bias voltage connected between said second valve means controlling electrode means and one of said second valve means main electrode means and of such polarity that when applied between said second valve means controlling electrode means and said second valve means one main electrode means said second valve means is held against conduction, means actuated as a consequence of the conduction of said first valve for initiating the discharge of said potential bias voltage whereby said second valve means is rendered conductive subsequent to a predetermined time interval subsequent to conduction of said first valve, a third valve having main electrodes and a control electrode, a second potential means connected between said third valve control electrode and one of said third valve main electrodes and energizable to place a blocking bias voltage between said third valve control electrode and said third valve one main electrode whereby conduction of said third valve is prevented, said second bias voltage means being dischargeable to permit conduction of said third valve, the initiation of the dicharge of said second bias voltage means being a said function of said second valve means, another of said second valve means functions being to energize a control circuit, and a third source of potential bias operable to render said second valve means ineffective to perform said other function, said third potential bias source being normally maintained ineffective and rendered effective as a consequence of conduction of said third valve.

27. In a timing system adapted to be energized from a source of alternating electrical energy, a first valve having main electrodes, circuit means including switch means connecting said electrodes to said source, switch means controlled in accordance with a conductive condition of said valve and operable upon initial conduction of said valve to maintain said valve energized irrespective of said first-named switch means, a second valve means having a pair of main electrode means and controlling electrode means, said second valve means having a plurality of controlling functions, means connecting said second valve means across said source, a first dischargeable source of potential bias voltage connected between said second valve means controlling electrode means and one of said second valve means main electrode means and of such polarity that when applied between said second valve means controlling electrode means and said second valve means one main electrode means said second valve means is held against conduction, means actuated as a consequence of the conduction of said first valve for initiating the discharge of said potential bias voltage whereby said second valve means is rendered conductive subsequent to a predetermined time interval subsequent to conduction of said first valve, a third valve having main electrodes and a control electrode, a second means normally maintaining a blocking bias voltage between said third valve control electrode and one of said third valve main electrodes whereby conduction of said third valve is prevented, said second bias voltage means being dischargeable to permit conduction of said third valve, the initiation of the discharge of said second bias voltage means being a said function of said second valve means, another of said second valve means functions being to energize a control circuit, a third source of potential bias operable to render said second valve means ineffective to perform said other function, said third potential bias source being normally maintained ineffective and rendered effective as a consequence of conduction of said third valve, a fourth valve and a fifth valve, a fourth dischargeable bias voltage means normally maintaining a blocking bias voltage on said fifth valve and controlled by said fourth valve, means controlling said fourth valve to permit said fourth dischargeable means to discharge and permit said fifth valve to conduct, and a fifth dischargeable bias voltage means controlled by said fifth valve and operable upon conduction thereof to block conduction of said first valve.

28. In a timing system adapted to be energized from a source of alternating electrical energy, a first valve having a pair of main electrodes and a control electrode, means for connecting said main electrodes across said source including switch means controlling energization thereof, switch means controlled in accordance with a conductive condition of said valve and operable upon initial conduction of said valve to maintain said valve energized, a second valve means having a pair of main electrode means and controlling electrode means and having a plurality of controlling functions, means connecting said second valve means across said source, a first dischargeable source of potential bias voltage connected between said second valve means controlling electrode means and one of said second valve means main electrode means and of such polarity that when applied between said second valve means controlling electrode means and said second valve means one main electrode means said second valve means is held against conduction, means actuated as a consequence of the conduction of said first valve for initiating the discharge of said potential bias voltage whereby said second valve means is rendered conductive subsequent to a predetermined time interval subsequent to conduction of said first valve, a third valve having main electrodes and a control electrode, a second means normally maintaining a blocking bias voltage between said third valve control electrode and one of said third valve main electrodes whereby conduction of said third valve is prevented, said second bias voltage means being dischargeable to permit conduction of said third valve, the discharge of said second bias voltage means being one of the functions of said second valve means plural functions, another of said second valve means plural functions being to energize a control circuit, a third source of potential bias operable to render said second valve means ineffective to perform said other plural function, said third potential bias source being normally maintained ineffective and rendered effective as a consequence of conduction of said third valve, a fourth valve and a fifth valve, a fourth dischargeable bias voltage means normally maintaining a blocking bias voltage on said fifth valve and controlled by said fourth valve, means controlling said fourth valve to permit said fourth dischargeable means to discharge and permit said fifth valve to conduct, and a fifth dischargeable bias voltage means controlled by said fifth valve and operable upon conduction thereof to establish a potential thereacross, and circuit means for applying said last-named established potential between one said first valve main electrodes and said first valve controlling electrode to block conduction of said first valve.

References Cited in the file of this patent
UNITED STATES PATENTS

| | | |
|---|---|---|
| 2,099,065 | Holden | Nov. 16, 1937 |
| 2,289,322 | Collom | July 7, 1942 |
| 2,333,363 | Collum | Nov. 2, 1943 |
| 2,533,369 | Hartwig | Dec. 12, 1950 |
| 2,677,052 | Rockafellow | Apr. 27, 1954 |

OTHER REFERENCES

Time Delay Circuit by Creighton C. Jones, *Review of Scientific Instruments*, September 1937, vol. 8; pages 319 through 322.